(12) United States Patent
Hartman

(10) Patent No.: US 6,901,699 B2
(45) Date of Patent: Jun. 7, 2005

(54) SEED-STARTER CELL AND TRAY FOR STARTING PLANTS

(76) Inventor: Gary Raymond Hartman, P.O. Box 1035, Hollister, CA (US) 95024

( * ) Notice: Subject to any disclaimer, the term of this patent is extended or adjusted under 35 U.S.C. 154(b) by 0 days.

(21) Appl. No.: 10/177,813

(22) Filed: Jun. 20, 2002

(65) Prior Publication Data

US 2003/0233787 A1 Dec. 25, 2003

(51) Int. Cl.[7] ................................................. A01G 9/10
(52) U.S. Cl. ............................................. 47/77; 47/87
(58) Field of Search .................................. 77/86, 87, 77

(56) References Cited

U.S. PATENT DOCUMENTS

| | | | | |
|---|---|---|---|---|
| 4,510,712 A | * | 4/1985 | Whitcomb | 47/65.5 |
| 4,622,775 A | * | 11/1986 | Glenn et al. | 47/63 |

FOREIGN PATENT DOCUMENTS

| | | | | |
|---|---|---|---|---|
| EP | 578153 A1 | * | 1/1994 | A01G/9/10 |
| GB | 2281018 A | * | 2/1995 | A01G/9/10 |
| JP | 9-74 | * | 1/1997 | |
| JP | 10234234 A | * | 9/1998 | A01G/9/10 |
| JP | 10295193 A | * | 11/1998 | A01G/9/02 |
| JP | 11235126 A | * | 8/1999 | A01G/9/02 |
| JP | 2000201544 A | * | 7/2000 | A01G/9/10 |
| JP | 2000300083 A | * | 10/2000 | A01G/9/10 |
| WO | WO 9319583 A1 | * | 10/1993 | A01G/9/10 |
| WO | WO 9935898 A1 | * | 7/1999 | A01G/9/02 |

* cited by examiner

Primary Examiner—Jeffrey L. Gellner
(74) Attorney, Agent, or Firm—Donald R. Boys; Central Coast Patent Agency

(57) ABSTRACT

A starter cell for starting a plant has a first opening at the topmost portion of the cell for facilitating plant seeding and growth, a second opening at the bottommost portion of the cell for facilitating root passage for air pruning of the root, and a plurality of inward-facing ridges formed vertically along the cell walls and along any cell comers. The cell is characterized in that the ridges are strategically placed to guide developing roots to avoid twisting and balling. In some embodiment the ridges have feet to provided for stacking, for example.

9 Claims, 4 Drawing Sheets

Section AA

Section AA

Section BB

Uniform Root Direction

Twisted Root Ball (prior art)

SEED-STARTER CELL AND TRAY FOR STARTING PLANTS

FIELD OF THE INVENTION

The present invention is in the field of horticulture apparatus and pertains more particularly to an improved seed-starter cell and tray for starting plants.

BACKGROUND OF THE INVENTION

In the field of horticulture one of the most common practices involves starting all sorts of plants, including trees, in cells provided either singularly or combined in multi-cell seed trays. Starter cells give seedlings a chance to sprout and grow in controlled conditions to a point where the new plant can be successfully transplanted to a more permanent growing environment such as out-of-doors gardens, landscapes, commercial fields, and so on.

Before transplanting a new plant from a starter cell to a more permanent environment it is desirable to have as many roots already initiated and established under the plant as possible. Roots grow from their tips, and typically follow the path of least resistance. The greater number of roots a starter plant has, the better chance it has of successfully surviving and thriving under transplant conditions.

A problem with starter cells found in the conventional art is that they are not designed to optimally prevent twisting of roots that happens within typical starter cells as a result of the root tips growing along paths of least resistance.

A twisted root ball or plug is a mass of a comparatively small number of usually abnormally large roots that are twisted generally about one another, typically forming a spring-like twisted root configuration. Twisted root balls hinder establishment of a host starter plant after transplant, in some cases, thwart the development of the plant, causing later, sometimes much later, failure. The twisting action of the roots in the starter cell causes inhibition in new root growth, because newer roots must establish above the ball and must grow around the obstacle. As a result a twisted root ball has fewer total roots established. Twisted roots also continue to grow in a twisted fashion after transplant, causing further damage to the plant. The twisted roots are usually weak and shallow water roots that are not beneficial to new plant establishment. The shallow establishment and fewer roots associated with a twisted root ball also cause the plant to be susceptible to wind after transplant, leading to plant blow-over.

Another critical component of starting plants in a starter cell is termed air pruning in the art. Simply put, air pruning requires an opening to be provided at the bottom of the cell so that root tips growing beyond the opening die from exposure to air, thereby promoting further root growth behind the point of trimming. For proper air pruning to occur within a starter cell, important relationships between the diameter of the cell, the slope of the cell and the design of the opening of the cell have to be provided during design and manufacture of the cell.

Typically, many prior art cells and trays are rigid or semi-rigid products molded from plastic in other than vacuum forming operations. It is, however, desirable to vacuum form seed trays by heating sheets of thin-walled material and pulling portions of the sheets into molds by vacuum, instead of using injection or other molding techniques, because vacuum forming is typically less expensive. While rigid and semi-rigid molded cells can rather easily have bottom openings designed for adequate air pruning, vacuum formed cells are more pliable, being created from thin plastic sheet, and cannot economically be molded with complete openings in the bottom for air pruning purposes.

What is clearly needed is a vacuum-formed seed tray comprising cells having a functional features to solve the limitations of prior-art cells mentioned above. Such a tray would be less expensive to manufacture and would promote better root growth and success percentages for starter plants under transplant conditions.

SUMMARY OF THE INVENTION

In a preferred embodiment of the present invention a starter cell for starting a plant is provided, comprising a first opening at the topmost portion of the cell for facilitating plant seeding and growth, a second opening at the bottommost portion of the cell for facilitating root passage for air pruning of the root, and a plurality of inward-facing ridges formed vertically along the cell walls and along any cell corners. The cell is characterized in that the ridges are strategically placed to guide developing roots to avoid twisting and balling.

In preferred embodiments there are expanded feet at the bottom of each ridge, to guide developing roots into the second opening while avoiding twisting a balling. IN some cases the expanded feet have substantially flat horizontal top portions, serving thereby as stacking lugs for stacking with other such cells. In preferred embodiments such cells are made through a vacuum forming process.

In many cases the ridges are rounded and substantially equally spaced from one another. Also in most cases of the cell in preferred embodiments a horizontal cross-section shows a substantially square pattern. Typically a plurality of the cells are formed together to produce a multi-cellular seed tray.

In another aspect of the invention a method for guiding developing roots of a starter plant in a starter cell is provided, comprising steps of (a) providing ridges in the starter cell strategically formed vertically along cell walls to separate and guide developing roots in a downward progression; and (b) providing expanded feet at the lower ends of the ridges formed on the walls and on any corners of the cell, the barriers providing further urging of the growing roots away from any cell corners and toward the center of the cell through the bottom opening of the cell.

In preferred embodiments of the method substantially flat tops are made on the feet to serve as stacking lugs, and the cells are vacuum formed from a heated plastic sheet. The ridges may be rounded and substantially equally spaced around cell walls.

In yet another aspect of the invention a seed tray comprising a plurality of starter cells for starting plants is provided, comprising a first opening at the topmost portion of each cell for facilitating plant seeding and growth, a second opening at the bottommost portion of each cell for facilitating root passage for air pruning of the root, and a plurality of inward-facing ridges formed vertically along the cell walls and along any cell corners. The tray is characterized in that the ridges are strategically placed to guide developing roots to avoid twisting and balling.

In preferred embodiments of the tray the ridges expanded feet at the bottom of each ridge, to guide developing roots into the second opening while avoiding twisting a balling. Also in preferred embodiments the expanded feet have substantially flat horizontal top portions, serving thereby as stacking lugs for stacking with other such cells, and the trays may be made through a vacuum forming process. In preferred embodiments of the trays of the invention the ridges are rounded and substantially equally spaced from one another. Further, a horizontal cross-section typically shows a substantially square pattern.

In embodiments of the invention taught in enabling detail below, for the first time plant starter cells and seed trays having such cells are provided that minimize or eliminate altogether twisting and balling of developing roots, and that also direct roots through an opening to be air pruned, encouraging development of new roots.

BRIEF DESCRIPTION OF THE DRAWING FIGURES

DESCRIPTION OF THE PREFERRED EMBODIMENTS

According to an embodiment of the present invention, a starter cell is provided for growing plants for transplant, comprising certain non-obvious features that promote optimum root growth and prevent twisting of roots within the cell, as well as promoting air pruning.

Figure 1:
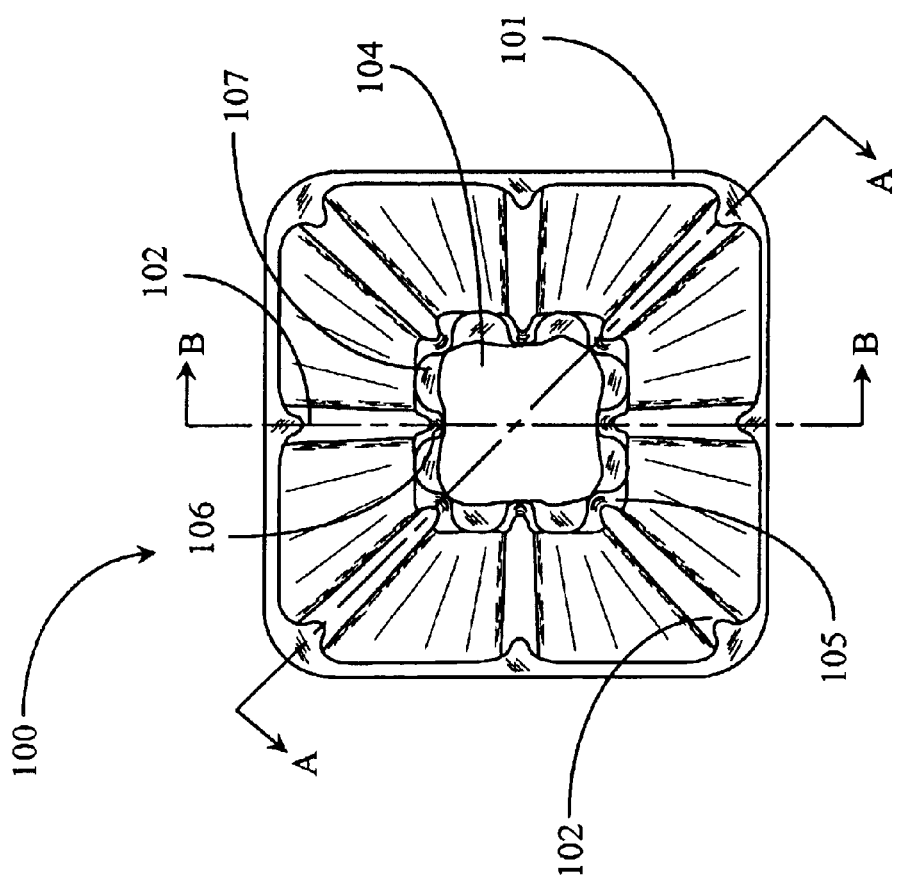
FIG. 1 is an overhead view of a single seed tray starter cell according to an embodiment of the present invention.

FIG. 1 is an overhead view of a seed tray cell 100 according to an embodiment of the present invention, which may be a stand-alone cell or, preferably, a part of a seed tray. There may be many cells 100 in a seed tray. Single cells like the cell of this example may also be provided for plants that are often purchased singularly, for example, trees, and more expensive landscaping plants.

In a preferred embodiment of the present invention cell 100 is vacuum formed in a process that produces a multi-cell seed tray from a polymer material. Because cell 100 is vacuum formed, the cell walls are relatively thinner and less rigid than would be the case with other molding techniques. Moreover, cell 100 is less expensive than prior art cells, partly because less material is required to form the tray with vacuum-forming techniques, and labor costs and equipment costs may also be lower.

In a preferred embodiment cell 100 is symmetrical in geometric features, and has generally a square or hexagonal pattern in cross-section orthogonal to the vertical axis of the cell. In other embodiments other patterns, including annular construction may be used.

In the embodiment of FIG. 1 the pattern illustrated is that of a square with rounded corners. The walls of cell 100 slope symmetrically from the top to the bottom of the, at least partly to create ease-of-release at the time starter plants are to be transplanted. In this embodiment a lip 101 is illustrated at the top of cell 100. This configuration is expected of a single cell provided to host one or a few seedlings. In a seed tray, material lip 101 forms a contagious connective plane between multiple cells formed from a single sheet of material for a seed tray. The thickness of the walls of cell 100 also can be held largely uniform throughout the architecture than can be achieved in other molding processes.

Cell 100 has a bottom opening 104 through the bottom-most portion of the cell, at lest partly to provide for air pruning, and also for draining excess water. Because the sides are sloped, opening 104 is substantially smaller in area than the top opening of cell, and typically leaves some connective material 107 between other features of the cell at the bottom. It is noted herein that opening 104 is not a complete opening but rather a connective opening that connects all of the features of the cell. Further, the shape of opening 104 is not necessarily square or in alignment with all of the features of cell 100, because the opening in each cell in a seed tray is created after vacuum forming by a multiple punch. Because it is desirable to create seed trays at a very high rate, typically with automatic equipment, and the cells are rather small, exact alignment between the punches and the cells is not practical. Therefore, in some cells the bottom opening will be slightly off center.

Cell 100 has a plurality of elongated ridges 102 provided therein, running generally vertically from top to bottom of the cell. Ridges 102 in a preferred embodiment are strategically placed, with one ridge running vertically along each inner wall of cell 100 at the approximate center of each wall, and ridges also at each of the four corners of the cell. Ridges 102 are substantially rounded and have a radius of about one-sixteenth of an inch, although there is a lot of leeway in this dimension.

Ridges 102 function in operation of cell 100 as root guides for developing roots. Root guides 102 are expanded to approximately one-quarter inch diameter at the bottom of each ridge, where the ridge meets lip, forming rounded feet 106. Feet 106 function as guides to roots developing along the inside edges of ridges 102, to prevent those roots from crossing over or twisting as they meet the bottom material 107, and serve to guide these roots into opening 104, where they will air trim. Root guides 102 and feet 106 also function to separate and spread root growth evenly within cell 100 along growth paths defined therebetween.

Ridges 102 formed in the corners of the cell are necessarily a bit different in cross-sectional shape than ridges 102 in the walls between the corners. They are, for example, approximately one quarter of a circle in cross-section rather than approximately one half a circle. These ridges also act as root guides as described above. Feet 105 for the corner root guides are also somewhat larger than feet 106, and are strategically located to fill the corner areas of cell 100, and to direct root growth away from the corners.

Feet 105 and 106 also act as stacking lugs for trays incorporating cells 100. Stacking lugs cause stacked rays to stand off from one another at a spacing equal to the foot height, rather than fitting too snugly together, which can pose problems in packaging and separation.

Typically feet 105 and 106 have a common height and shape that includes a shelf area, best seen in FIGS. 2 and 3, and described further below. The sides of the feet are vertical, rather than sloped.

Figure 2:
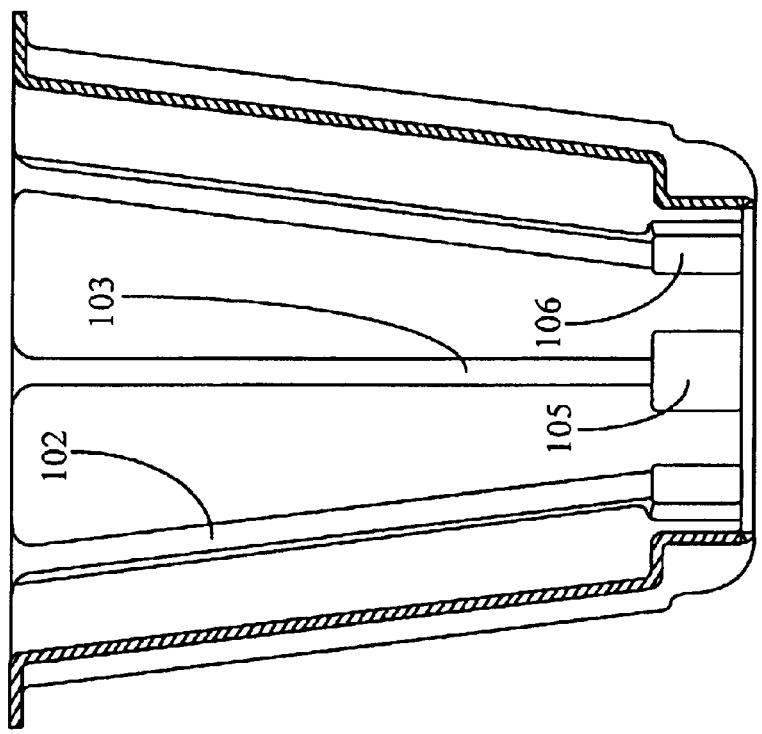
FIG. 2 is a section view of the starter cell of FIG. 1 taken generally along the section line AA of FIG. 1.

FIG. 2 is a section view of cell 100 of FIG. 1 taken generally along the section line A—A of FIG. 1. FIG. 2 clearly shows the slope of the walls as described above. The exact angle of slope will depend in part on the diameter and height of cell 100, however a 2 to 5 degree slope is preferred in many embodiments. Section A—A is taken across the major diameter of cell 100 directly through corner root guides 103 looking directly into a corner area showing elevation of a root guide (103) and a perspective of immediately adjacent root guides (102) on the adjacent walls of cell 100. It can be appreciated by this view of cell 100 that features 106 and 105 as well as features 102 and 103 are not solid or filled but are vacuum formed to have a uniform wall thickness. This feature adds pliability to cell 100 and facilitates easier plant separation from the cell than would be the case with more rigid cells of prior art.

As roots form and grow within cell 100 root guides 103 and 102 generally train the roots downward and along optimum growth paths (broadly formed between ridges 102 and 103), not allowing the roots to coil or otherwise develop laterally. Before exiting cell 100 through opening (104) at the bottom, feet 105 (triangular corner foot) and feet 106 (squared side-wall feet) keep roots trained away from the sides and corner areas and urge them toward the center of cell 100 center where they will eventually be exposed through opening 104 for proper air pruning.

Referring momentarily back to FIG. 1, the growth areas located symmetrically between feet 105 and 106 are substantially webbed at the bottom (shelf 107) as a result of vacuum forming, and help to direct root growth at the bottom toward center of cell 100. The sectioned portion of the walls of cell 100 defining section A—A are cross hatched and exhibit a largely uniform thickness that can be controlled to a much thinner dimension than can be achieved by other molding techniques. Land areas located on top of features 105 and 106 also function to train roots away from corners and toward center as well as providing barriers that promote root separation and stacking lugs.

Figure 3:
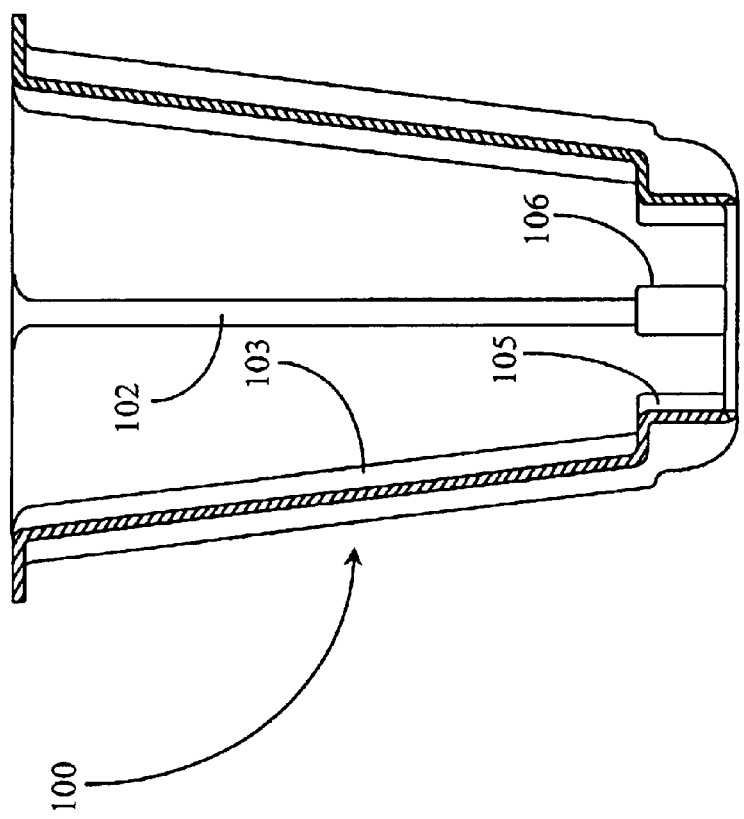
FIG. 3 is a section view of the starter cell of FIG. 1 taken generally along the section line BB of FIG. 1.

FIG. 3 is a section view of cell 100 of FIG. 1 taken generally along the section lines BB of FIG. 1. In this view, cell 100 is seen sectioned substantially through its minor diameter directly through opposing root guides 102 and feet 106 looking directly into a root guide 102 and foot 106. Corner guides 103 and corner feet 105 located in the corners of cell 100 adjacent to the wall supporting visible guide 102 and foot 106 are visible in this sectioned view. It can be seen in this view as well as in section A—A (FIG. 2) that the lower portion of cell 100 supporting features 105 and 106 is substantially vertical in profile and not sloped like the major cell walls supporting root guides 102 and 103. Corner feet and side-wall feet 105 and 106 respectively act as stacking lugs (8 total) as was previously described. Because there are 8 stacking lugs within the cell, cell 100 is more easily dislodged from other cells when trays are un-stacked.

Figure 4B:
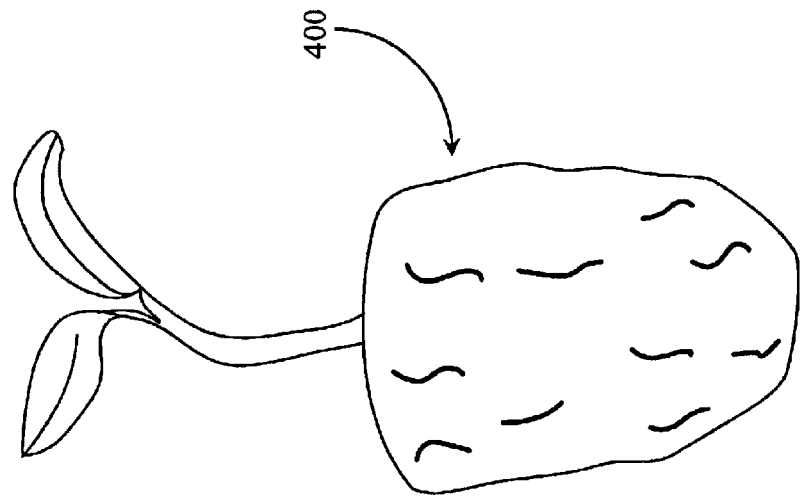
FIG. 4B is a plan view of a starter plant exhibiting uniform root growth promoted by the starter cell of the present invention.
Figure 4A:
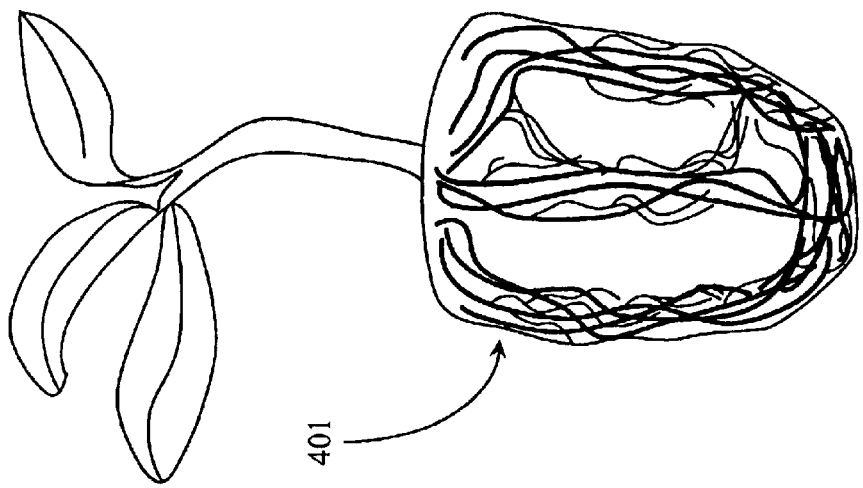
FIG. 4A is a plan view of a starter plant exhibiting a twisted root ball according to prior-art cell growth patterns.

FIG. 4A is a somewhat schematic elevation view of a starter plant 401 exhibiting a twisted root ball according to prior-art cell growth patterns. There are many exposed roots, and they are growing in a twisted manner around each other, and have grown at the bottom of the root ball into a spiral path. Upon transplanting, these starter plants will not be very successful. As a result of the balling and twisting of the roots, there is a barrier for the roots taking hold and developing normally after transplanting. After transplanting starter plant 401, the twisted root ball will continue to develop in an abnormal pattern further inhibiting plant establishment.

FIG. 4B is a plan view of a starter plant 400 exhibiting uniform root growth aided by the starter cell of the present invention. Starter plant 400 exhibits more uniform root growth than does plant 401 of FIG. 4A in comparison. Plant 400 has more roots established, mostly within the root ball, and is also larger than plant 400. The roots of plant 400 have been trained to grow substantially along the growth paths defined by the root guides of cell 100. Empirical testing has proven that the design of cell 100 promotes better plant growth and plant establishment by avoiding the twisted root problem and by enabling proper air pruning aided by features of cell 100. After transplanting, empirical testing shows that plants grown in the cell of the present invention have deeper root establishment, are hardier, and less subject to the usual hazards as they develop further It will be apparent to one with skill in horticulture that the unique design of cell 100 of the present invention provides healthier plants that are better suited to transplanting than plants grown in prior-art starter cells. Moreover, manufacturing costs associated with mass-producing seed trays comprising cells of the invention are typically less tan for conventional trays.

It is not explicitly required that starter cell 100 be formed of a rounded square configuration in order to practice the present invention. In other embodiments a hexagonal or octagonal pattern may be used to form the starter cells. Annular cell patterns such as ovals and circles may also be used. As long as the root guide features and feet are provided, many differing shapes may be used. Placement and number of root guide and foot features may vary according to shape of the cell and are largely manufacturing considerations.

In lieu of the many possible embodiments that can support the root training features of the present invention the method and apparatus of the invention should be afforded the broadest possible scope under examination. The spirit and scope of the present invention is limited only by the claims that follow.

What is claimed is:

1. A plant starter cell comprising:

a substantially open top for facilitating plant seeding and growth;

one or more downward sloping side walls extending from the substantially open top area to a substantially open bottom;

a plurality of inward-facing ridges formed vertically along the side walls and along four corners between the side walls;

a plurality of feet associated one to one with the plurality of inward facing ridges, each foot beginning at the lowermost extent of the associated ridge, forming a horizontal shelf area around the periphery of the ridge, and having sides extending to the bottom of the cell;

wherein, the feet have larger cross-sectional widths than their associated ridges, and the opening of the substantially open bottom connects all of the feet.

2. The starter cell of claim 1 wherein the cell is made through a vacuum forming process.

3. The starter cell of claim 1 wherein the ridges are rounded and substantially equally spaced from one another.

4. The starter cell of claim 1 wherein a horizontal cross-section shows a substantially square pattern.

5. The starter cell of claim 1 wherein a plurality of the cells are formed together to produce a multi-cellular seed tray.

6. A seed tray, comprising a plurality of starter cells for starting plants, each cell comprising;

a substantially open top for facilitating plant seeding and growth;

one or more downward sloping side walls extending from the substantially open top area to a substantially open bottom;

a plurality of inward-facing ridges formed vertically along the side walls and along four corners between the side walls;

a plurality of feet associated one to one with the plurality of inward facing ridges, each foot beginning at the lowermost extent of the associated ridge, forming a horizontal shelf area around the periphery of the ridge, and having sides extending to the bottom of the cell;

wherein, the feet have larger cross-sectional widths than their associated ridges, and the opening of the substantially open bottom connects all of the feet.

7. The seed tray of claim 6 wherein the tray is made through a vacuum forming process from a heated plastic sheet.

8. The seed tray of claim 6 wherein the ridges are rounded and substantially equally spaced from one another.

9. The seed tray of claim 6 wherein a horizontal cross-section shows a substantially square pattern.

* * * * *